Sept. 3, 1929.   R. G. LOCKETT   1,726,674
MOTOR CONTROLLER
Filed March 20, 1926    2 Sheets-Sheet 2
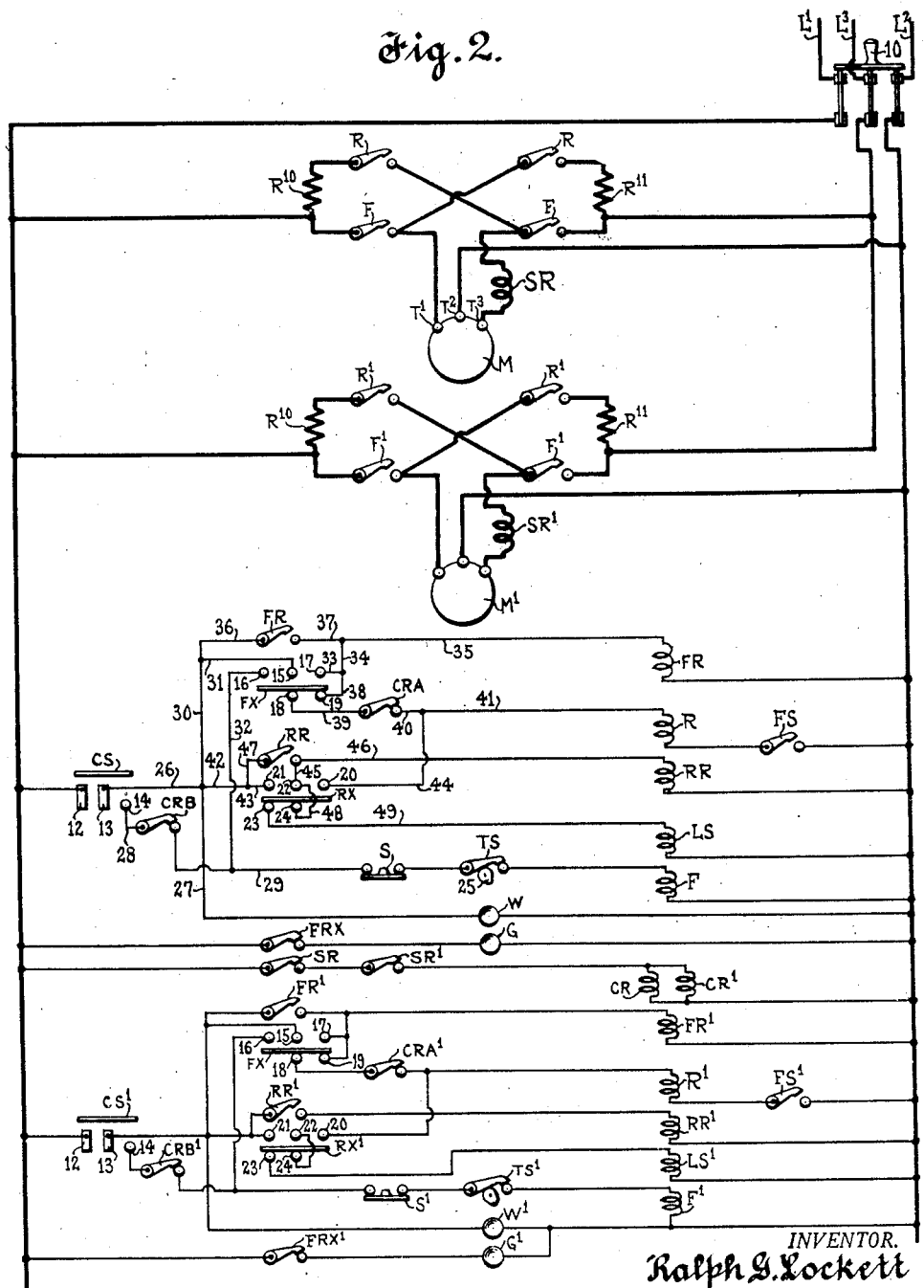

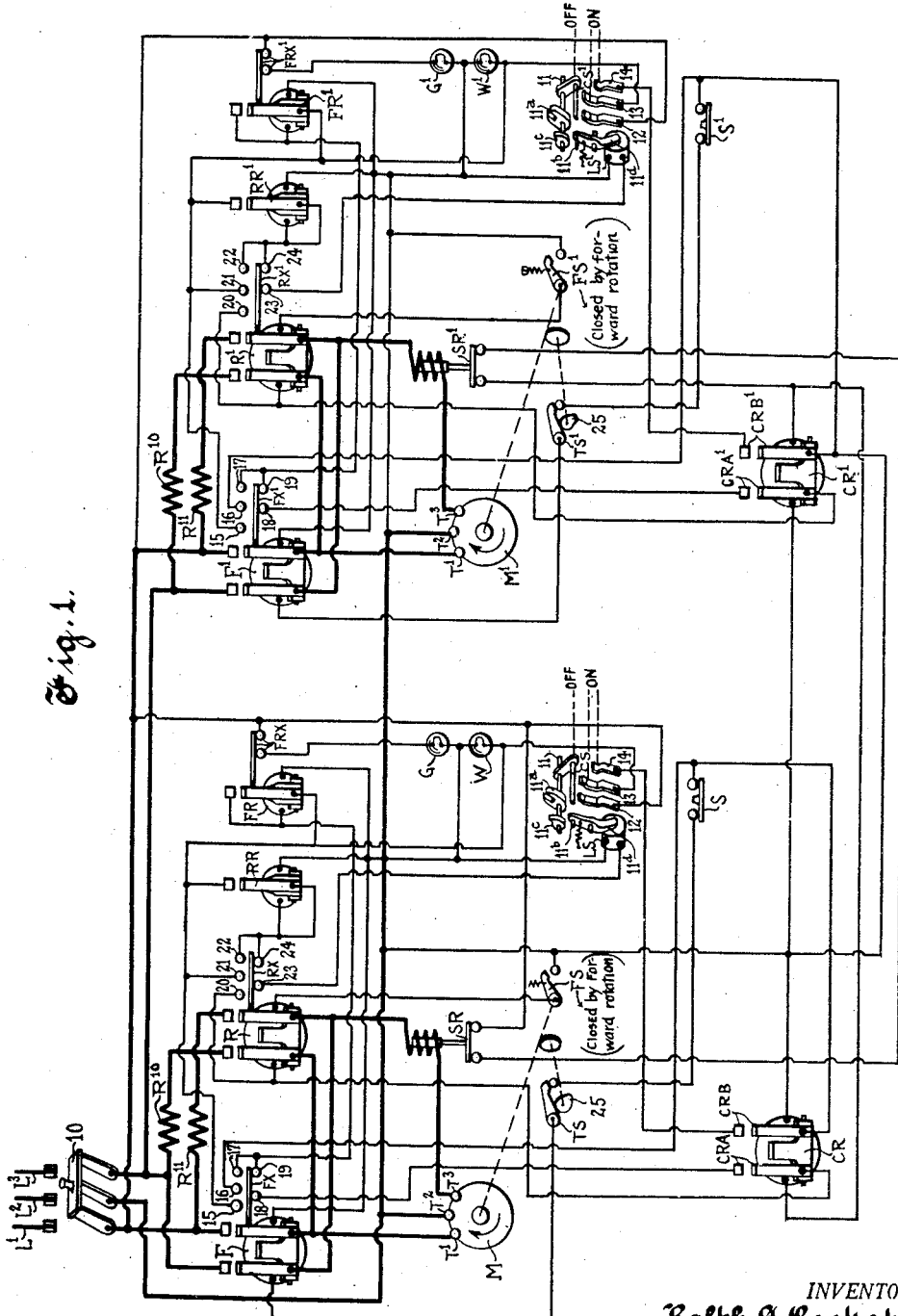

Patented Sept. 3, 1929.

1,726,674

UNITED STATES PATENT OFFICE.

RALPH G. LOCKETT, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE.

MOTOR CONTROLLER.

Application filed March 20, 1926. Serial No. 96,122.

This invention relates to improvements in motor controllers, and more particularly to interlocking control means for a plurality of motors to be supplied with power from a common source.

Where a plurality of extractors or other machines having a high moment of inertia are adapted to be started, driven and stopped with power by independently operable motors which are supplied with energy from a common feeder, it is undesirable to start or stop two or more of the machines at the same time, or to start one machine during stopping of another due to the heavy load imposed upon the line thereby; and one object of my invention is to provide novel interlocking control means whereby a proper but variable sequence of starting and stopping operations of the various machines is insured.

Another object is to provide a device of the above character having means for effecting automatic stopping of the several motors under the insured conditions of proper sequence aforementioned.

Another object is to provide such a device having manual control means for initiating the starting and stopping operations of the motors individually, but subject to the aforementioned interlocking control means.

Other objects and advantages of the invention will hereinafter appear.

The accompanying drawing illustrates an embodiment of my invention which will now be described, it being understood that various changes may be made in the construction and arrangement of parts without departing from the spirit and scope of my invention as defined in the appended claims.

In the drawing, Figure 1 illustrates schematically and diagrammatically a controller constructed and arranged in accordance with my invention, and Fig. 2 is an across-the-line diagram of the controller illustrated in Fig. 1.

Referring to Fig. 1, M and $M^1$ designate motors each adapted to drive an extractor or the like, not shown, the circuits of said motors being commutatable for operation thereof in a forward direction upon closure of forward switches F and $F^1$, respectively, switches R and $R^1$ being adapted to provide reverse circuit connections for the respective motors whereby said motors may be stopped by plugging in a well known manner. Actual reverse rotation of the motor armature is prevented by means of the frictional or magnetic drag switches diagrammatically illustrated at FS and $FS^1$, said switches being operable in the manner disclosed in the DuBois Patent No. 1,161,932, dated November 30, 1915.

While I have shown a common main line switch 10, it will be apparent that individual switches of this type may be provided for the respective motors. Also, while I have illustrated means for control of but two motors, it is to be understood that the number of control units in the system may be greatly increased, whereas in practice it is customary to include as many as five or six motors and their control elements in a system supplied with energy from a generator or other common source.

Thus, upon closure of switch 10 lamp G is energized by a circuit extending through normally closed contacts FRX of relay FR, said lamp preferably having a distinctive color, such as green, to indicate that the motor is not in operation. Similarly, the closing windings of relays CR and $CR^1$ will be energized by circuits extending through the normally closed contacts of relays SR and $SR^1$, said relays having windings connected in series with the respective motor circuits, whereby the contacts thereof are adapted to be opened under excessive current conditions incident to starting and stopping of the respective motors.

As hereinafter more fully described the arrangement is such that during starting or stopping of any one of the motors in the system the contacts of the series relay SR or $SR^1$ thereof will be opened, thereby interrupting the energizing circuits of relays CR, $CR^1$, etc., so that none of the other motors can be either stopped by plugging or started until the excessive current in the circuit of the first-mentioned motor has decreased sufficiently to permit reclosure of its series relay contacts. As will be apparent, the relays CR and $CR^1$ have no effect upon the control of the individual motors during normal running operation of the latter, and hence all motors in the system may be operated simultaneously at normal running speed, the aforementioned control elements being merely adapted to insure starting of the motors one at a time and stopping thereof by plugging one at a time.

If motor M¹ is either standing still, or running at normal speed after completion of its starting operation, motor M may be started by closure of the extractor cover, not shown, which is biased to open position. Said cover is suitably connected with and adapted to move an element 11ᵃ which is fixed to a rock shaft 11, the latter carrying a bridging contact CS adapted to simultaneously engage the relatively long stationary contacts 12 and 13, thus completing an energizing circuit for lamp W, which may be white to distinguish from lamp G. Complete closing movement of the cover moreover effects engagement of contact CS with a relatively short stationary contact 14, which cooperates with contact 12 to provide a temporary energizing circuit for the winding of forward switch F, said circuit extending through the contacts CRB of relay CR (which as aforedescribed is in closed position), and through the normally closed stop push-button switch S and timing switch TS.

Upon manual release of the cover the same assumes a position wherein contact CS is disengaged from contact 14, whereas the former contact is latched in engagement with contacts 12 and 13 through engagement of spring-biased latch 11ᵇ with the shouldered cam 11ᶜ carried by shaft 11, said latch having an armature 11ᵈ to effect tripping thereof against the action of said spring when latch solenoid LS is energized. It will be noted that by the arrangement aforedescribed cooperative positioning of the contacts is insured upon initiation of the motor starting operation.

Switch F upon closure thereof provides a maintaining circuit for itself through its noramlly open auxiliary contacts 15, FX and 16. Closure of said auxiliary contacts 15, FX and 17 also provides an energizing circuit for the winding of foward relay FR, whereas said relay maintains itself through the main contacts thereof. Opening of the normally closed auxiliary contacts FRX interrupts the energizing circuit of lamp G, thereby indicating that the starting operation of motor M has been initiated.

Closure of switch F as aforedescribed provides for connection of lines $L^1$, $L^2$ and $L^3$ to terminals $T^1$, $T^2$ and $T^3$ of motor M for operation of the latter in a forward direction, the power circuits of said motor being obvious. The timing switch TS aforementioned is of any suitable type, and as shown the same comprises a cam 25 geared to the motor shaft or other rotary part of the device, whereby after a predetermined number of revolutions of the device said switch will be opened to interrupt the energizing circuit of switch F. Here it may be noted that the frictional or magnetic drag switch FS is normally biased to open position, whereas upon operation of the motor in a forward direction said switch is drawn to closed position and is automatically held in such position until the motor is brought substantially to rest, as described in the aforementioned DuBois patent.

Thus upon opening of switch F an energizing circuit is provided for reverse torque switch R through reclosure of auxiliary contacts FX, 18 and 19 of switch F, the main contacts of relay FR, contacts CRA of relay CR and the contacts of switch FS being then in closed position. Upon closure of switch R lines $L^1$, $L^2$ and $L^3$ are connected with terminals $T^3$, $T^2$ and $T^1$, respectively, whereby reverse torque is provided for the motor to bring the same to rest in the manner aforedescribed, suitable plugging resistance R lines $L^1$, $L^2$ and $L^3$ are connected with the motor under these conditions.

Switch R in closing provides a maintaining circuit for itself through auxiliary contacts 21, RX and 20; whereas auxiliary contacts 21, RX and 22 thereof provide an energizing circuit for reverse relay RR, the latter upon closure providing a maintaining circuit for itself. Under the aforementioned conditions motor M will be slowed down and when the same is brought substantially to rest contacts FS will be permitted to separate under their normal bias to interrupt the energizing circuit of switch R, whereby reverse rotation of the motor armature is prevented. Switch R in opening effects reclosure of auxiliary contacts RX, 23 and 24 thereby completing an energizing circuit for the latch solenoid LS (the contacts of relay RR being maintained in closed position). Upon withdrawal of the latch 11ᵇ by solenoid LS the extractor cover is free to move under its bias to open position for effecting disengagement of bridging contact CS from contacts 12 and 13, thereby resetting the control of motor M for initiation of another cycle of operation upon reclosure of the extractor cover.

While I have described stopping of the motor through operation of timing switch TS, it will be apparent that such operation may also be effected through depression of pushbutton switch S. Similarly, it will be seen that the control elements for motor M¹ are in all respects like those described in connection with motor M. Moreover, if additional motors and control units are to be included in the system it is only necessary to connect the contacts of the series relays thereof in series with contacts SR and SR¹ and to connect the windings corresponding with windings CR and CR¹ in circuit with the latter.

Operation of the device will now be more fully described with reference to the diagram of Fig. 2. Thus with line switch 10 in closed position as shown, an energizing circuit will be provided for green lamp G, said circuit extending from line $L^1$ through normally closed auxiliary contacts FRX of relay FR and through said lamp to line $L^2$. The series relay contacts of motors M and $M^1$ being in their normally closed position, an energizing circuit is provided for the winding of relay CR, said circuit extending from line $L^1$ through said contacts SR and $SR^1$ in series, and thence through said winding CR (in parallel with the winding of relay $CR^1$) to line $L^2$. Thus the normally open contacts CRA and CRB of relay CR will be held in closed position, as shown, and upon initial closing movement of the extractor cover bridging contact CS will be brought into engagement with contacts 12 and 13, thereby providing an energizing circuit for white lamp W, said circuit extending from line $L^1$ through said contacts and by conductors 26 and 27 through said lamp to line $L^2$.

Continued closing movement of the extractor cover effects engagement of contact CS with contact 14, thus providing an energizing circuit for the winding of switch F, said circuit extending from line $L^1$ through contacts 12, CS and 14, by conductor 28 through contacts CRB of relay CR, by conductor 29 through the contacts of stop switch S and timing switch TS, and through the winding of switch F to line $L^2$. Upon closure of the contacts of switch F a circuit is completed for motor M for effecting operation thereof in a forward direction, said power circuit being obvious.

During starting of motor M in the manner just described the series relay coil SR is sufficiently energized to effect opening of its contacts SR, whereby the energizing circuit of windings CR and $CR^1$ is interrupted. Contacts CRA and CRB of relay CR and contacts $CRA^1$ and $CRB^1$ of relay $CR^1$ will therefore move to their normally open positions, contacts $CRB^1$ in such position preventing completion of the energizing circuit of switch $F^1$ of motor $M^1$ if the latter is standing still; whereas contacts $CRA^1$ in such position prevent completion of the energizing circuit of the plugging or reverse switch $R^1$, assuming the motor $M^1$ to have been running at normal speed. On the other hand such starting or stopping operations of motor $M^1$ will be delayed pending attainment of normal speed by motor M which results in a sufficient decrease in the current through series relay coil SR to permit reclosure of the contacts of the latter.

Referring again to the control of motor M, it will be apparent that upon closure of the normally open auxiliary contacts of switch F a maintaining circuit is provided for the latter, said circuit extending from line $L^1$ through contacts 12, CS and 13, by conductors 26, 30 and 31, through said auxiliary contacts 15, FX and 16, by conductors 32 and 29, and thence through the winding of switch F to line $L^2$ as heretofore traced. Upon release of the extractor cover the same is movable under its bias to effect disengagement of contacts CS and 14, whereas said cover is mechanically latched in the manner aforedescribed to insure continued engagement of contact CS with contacts 12 and 13.

Closure of the normally open auxiliary contacts of switch F likewise provides an energizing circuit for the winding of relay FR, said circuit extending from line $L^1$ to auxiliary contact FX, as just traced, thence through contact 17, by conductors 33, 34 and 35 through said winding to line $L^2$. Relay FR upon closure provides a maintaining circuit for its winding, said circuit extending from line $L^1$ to conductor 30 as heretofore traced, thence by conductor 36 through the contacts of relay FR and by conductors 37 and 35 through said winding to line $L^2$. Similarly, upon opening of the normally closed auxiliary contacts FRX of relay FR the energizing circuit of lamp G is interrupted. At all times during operation of the motor M in a forward direction the normally open contacts FS of the frictional or magnetic drag switch are held in closed position, as aforedescribed.

Thus, upon interruption of the energizing circuit of switch F through automatic opening of timing switch TS or through manual opening of switch S, the contacts of switch F are opened to disconnect terminals $T^1$ and $T^2$ from lines $L^1$ and $L^3$, respectively; whereas upon reclosure of the normally closed auxiliary contacts of switch F an energizing circuit is provided for the winding of switch R, said circuit extending from line $L^1$ to conductor 30 as previously traced, by conductor 36 through the contacts of relay FR, by conductors 37, 34 and 38 through auxiliary contacts 19, FX and 18, by conductor 39 through contacts CRA of relay CR, by conductors 40 and 41 through said winding, and thence through the contacts FS of the friction switch to line $L^2$. Closure of the contacts of switch R provides reverse torque power connections for motor M wherein terminal $T^3$ is connected to line $L^1$ through suitable plugging resistance $R^{10}$ and terminal $T^1$ is connected to line $L^3$ through plugging resistance $R^{11}$.

Switch R through closure of its normally open auxiliary contacts provides a maintaining circuit for itself, which circuit may be traced from line $L^1$ to conductor 26, by conductors 42 and 43 through contacts 21, RX and 20, by conductor 44 to conductor 41, and thence to line $L^2$ as previously traced. Said auxiliary contacts also complete an energizing circuit for the winding of relay RR, said circuit extending from line $L^1$ to contact 21 as just traced, thence through contacts RX and 22, by conductors 45 and 46 through said winding to line L². Relay RR upon closure provides a maintaining circuit for itself, said circuit extending from line L¹ to conductor 42, thence by conductor 47 through the contacts of said relay, and through the winding thereof to line L².

As the result of the aforementioned plugging operation motor M is brought substantially to rest, whereupon contacts FS of the friction switch are permitted to open under the normal bias thereof, thereby interrupting the energizing circuit of switch R which opens to prevent reverse rotation of the motor. Switch R in opening effects reclosure of its normally closed contacts, thereby providing an energizing circuit for the latch solenoid LS, said circuit extending from line L¹ to conductor 42, thence by conductor 47 through the contacts of relay RR, by conductors 45 and 48 through auxiliary contacts 24, RX and 23, and thence by conductor 49 through said latch solenoid to line L². The mechanical latch is thus tripped to permit opening movement of the extractor cover, with consequent disengagement of contact CS from contacts 12 and 13, thereby interrupting the energizing circuit of white lamp W and the maintaining circuits of relays FR and RR. In the above manner the control unit for motor M is reset for initiating another cycle of operation of the latter upon reclosure of the extractor cover.

It is to be noted that the maintaining circuit for the winding of switch F becomes effective prior to opening of the contacts CRB in the manner aforedescribed, whereas the maintaining circuit for switch R likewise becomes effective during stopping prior to opening of contacts CRA.

Operation of the control unit for motor M¹, or any other motor to be included in the system, is in all respects identical with that described in connection with motor M, and hence detailed description of the former is deemed unnecessary.

From the foregoing description it will be seen that the cycle of operation of each motor may be initiated at will by merely closing the cover of the extractor to be driven thereby, provided each of the other motors in the system is either standing still or running at normal speed, so that all of the series relay contacts are in their normally closed position. As soon as the cover of the extractor driven by motor M is closed the energizing circuit for lamp W will be completed, and said circuit will be maintained until the operating cycle of the motor is completed. However, if the motor M¹ is being started or stopped at the time it is attempted to start or stop motor M, neither the forward switch F nor reverse torque switch R of the latter can be energized due to open positioning of contacts CRB and CRA, respectively, as heretofore described.

Moreover, the circuit of lamp G will be maintained until motor M is actually started, and hence joint illumination of lamps G and W indicates failure to complete the starting operation of motor M, so that the operator may thereafter again depress the extractor cover to complete the energizing circuit of switch F. If desired, however, any suitable arrangement of electroresponsive relays may be provided to effect completion of the starting circuits of any of the motors automatically after initial closure of the respective covers of the extractors, subject to the aforementioned simultaneous reclosure of all of the series relay contacts.

In the foregoing manner I provide for visible indication of the condition of each motor and its associated control elements with respect to its cycle of operation, thereby insuring economy of time in manipulation of the system, while obviating needless repetition of the respective cycles of operation.

What I claim and desire to secure by Letters Patent is:

1. The combination with a plurality of electric motors to be supplied with energy from a common source, of individual starting and stopping means for the respective motors, and current responsive means adapted during starting or stopping of any one of said motors to insure against starting or stopping of other of the same.

2. The combination with a plurality of electric motors to be supplied with energy from a common source, of individual starting and stopping means for the respective motors, and current responsive means adapted during starting or stopping of any one of said motors to insure against starting or stopping of other of the same, said last-mentioned means being also adapted to permit simultaneous operation of all of said motors at normal running speeds thereof.

3. The combination with a plurality of electric motors to be supplied with energy from a common source, of individual starting and stopping means for the respective motors, and means adapted during starting or stopping of any of said motors to insure against starting or stopping of other of the same, said means comprising a plurality of relays each having a winding in series with the circuit of one of said motors.

4. The combination with a plurality of electric motors, of a common source of energy supply therefor, manually operable means tending to cause initiation of the starting operations of the respective motors at will, and means responsive to current conditions in the respective motor circuits to render said last-mentioned means ineffective for starting more than one motor at a time.

5. The combination with a plurality of electric motors, of a common source of energy supply therefor, manually operable starting means and automatically operable stopping means for each of said motors, and means responsive to current conditions in the respective motor circuits and adapted during starting or stopping of one of said motors to insure against starting or stopping of other of the same.

6. The combination with a plurality of electric motors, of a common source of energy supply therefor, manually operable starting means and automatically operable stopping means for each of said motors, and means responsive to current conditions in the respective motor circuits and adapted during starting or stopping of one of said motors to insure against starting or stopping of other of the same, said last-mentioned means being also adapted to permit simultaneous operation of any number of said motors at normal running speeds thereof.

7. The combination with a plurality of electric motors, of individually operable control means for each of said motors to effect starting and stopping of the same, and common means responsive to current conditions in the respective motor circuits and cooperating with said first-mentioned means to prevent starting or stopping of any one of said motors during starting or stopping of another of the same.

8. The combination with a plurality of driving motors and a common source of energy supply therefor, of control means to provide starting and running connections for said motors and to provide for stopping thereof by plugging, series relays each having a winding in series with its respective motor, and contacts controlled thereby to prevent starting or stopping of any of said motors during starting or stopping of another of the same.

9. The combination with a plurality of motors adapted to be supplied with energy from a common source, of individually operable control means for each of said motors to effect starting and running of the same and stopping thereof by plugging, and joint control means for said individual control means to insure against simultaneous operation of two or more thereof for starting or stopping of their respective motors, said joint control means comprising a plurality of series relays each having a winding in circuit with one of said motors.

10. In a controller for a plurality of motor driven machines, the combination with individually operable driving motors therefor adapted to be supplied with energy from a common source, individually operable control means for each of said motors comprising an electroresponsive switch adapted upon closure thereof to effect starting and running of the motor controlled thereby, a relay having a winding in series with said motor, and means operable by said relay during starting of said motor to prevent closure of the electroresponsive switches controlling other of said motors.

11. In a controller for a plurality of motor driven machines, the combination with individually operable driving motors therefor adapted to be supplied with energy from a common source, individually operable control means for each of said motors comprising an electroresponsive switch adapted upon closure thereof to effect starting and running of the motor controlled thereby and another electroresponsive switch adapted upon closure thereof to effect stopping of said motor by plugging, a relay having a winding in series with said motor, and means operable by said relay during starting or stopping of said motor to prevent closure of the electroresponsive switches controlling other of said motors.

12. The combination with a plurality of electric motors, of a common source of energy supply therefor, manually operable means tending to provide for initiation of the starting operations of the respective motors at will, and means operable automatically in response to current conditions in the respective motor circuits to render said last mentioned means ineffective for starting more than one motor at a time.

13. The combination with a plurality of electric motors, of a common source of energy supply therefor, manually operable starting means and automatically operable stopping means for each of said motors, and means operable automatically in response to current conditions incident to starting or stopping of one of said motors to insure against starting or stopping of other of the same.

14. The combination with a plurality of electric motors, of a common source of energy supply therefor, manually operable starting means, and automatically operable stopping means for each of said motors, and means operable automatically in response to current conditions incident to starting or stopping of one of said motors to insure against starting or stopping of other of the same, said last mentioned means being also adapted to permit simultaneous operation of all or certain of said motors at normal running speeds thereof.

15. The combination with a plurality of electric motors to be supplied with energy from a common source, of individual starting and stopping means for the respective motors, and means adapted to prevent starting or stopping of certain of said motors while the current of other of said motors exceeds a predetermined value, said means comprising a plurality of relays each having a winding in series in the circuit of one of said motors.

16. The combination with a plurality of driving motors and a common source of energy supply therefor, of control means to provide starting and running connections for said motors and to provide for stopping thereof by plugging, relays each having a winding adapted to be connected in series with its respective motor, and contacts controlled thereby to prevent starting or stopping of certain of said motors during starting or stopping of other of the same.

17. The combination with a plurality of motors adapted to be supplied with energy from a common source, of individually operable control means for each of said motors to effect starting and running of the same and stopping thereof by plugging, and joint control means for said individual control means to insure against operation of the individual control means for starting or stopping of their respective motors pending decrease of the current consumed by the motors to a predetermined value, said joint control means comprising a plurality of series relays each having a winding in circuit with one of said motors.

18. The combination with a plurality of electric motors, of a common source of energy supply therefor, means for effecting operation of said motors through cycles including starting thereof and stopping thereof by plugging, and means permitting starting of certain of said motors or stopping thereof by plugging during normal operation or inoperation of other of the same, said means including means responsive to current conditions in the respective motor circuits and adapted to insure against starting of certain of said motors or stopping thereof by plugging during starting or stop ping of other of the same, In witness whereof, I have hereunto subscribed my name.

RALPH G. LOCKETT.

Certificate of Correction

Patent No. 1,726,674.                                   Granted September 3, 1929, to

RALPH G. LOCKETT

It is hereby certified that error appears in the printed specification of the above numbered patent requiring correction as follows: Page 1, line 88, for the word "and" read *or;* page 2, line 41, for the misspelled word "noramlly" read *normally;* line 84, strike out "R lines $L^1$ $L^2$ and $L^3$ are connected" and insert instead $R^{10}$ *and* $R^{11}$ *being included in circuit;* and that the said Letters Patent should be read with these corrections therein that the same may conform to the record of the case in the Patent Office.

Signed and sealed this 25th day of March, A. D. 1930.

[SEAL.]

M. J. MOORE,
*Acting Commissioner of Patents.*